(12) United States Patent
DeLeeuw et al.

(10) Patent No.: US 6,550,780 B1
(45) Date of Patent: Apr. 22, 2003

(54) WASHER SEAL FOR A CAM BRAKING SYSTEM

(75) Inventors: William L. DeLeeuw, Rochester Hills, MI (US); David K. Pfister, Ortonville, MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/454,628

(22) Filed: Dec. 3, 1999

(51) Int. Cl.[7] ................................................. F16J 15/32
(52) U.S. Cl. .................... 277/549; 277/551; 277/572
(58) Field of Search ................................. 277/549, 551, 277/560, 562, 566, 572, 573

(56) References Cited

U.S. PATENT DOCUMENTS

| | | | | |
|---|---|---|---|---|
| 3,677,374 A | * | 7/1972 | Newstead et al. | |
| 3,731,837 A | * | 5/1973 | Platts et al. | |
| 3,930,655 A | * | 1/1976 | Fern | |
| 4,126,317 A | * | 11/1978 | Bainard | |
| 4,131,286 A | * | 12/1978 | Bainard | |
| 4,141,562 A | * | 2/1979 | Wu | |
| 4,153,260 A | * | 5/1979 | Joyner | |
| 4,215,869 A | * | 8/1980 | Pendleton | |
| 4,306,126 A | * | 12/1981 | Howard | |
| 4,385,789 A | * | 5/1983 | Batt | |
| 4,669,737 A | * | 6/1987 | Diffenderfer | |
| 4,921,258 A | * | 5/1990 | Fournier et al. | |
| 5,026,324 A | * | 6/1991 | Schurger et al. | |
| 5,549,286 A | * | 8/1996 | Vacca | |
| 5,853,177 A | * | 12/1998 | Brissette et al. | |
| 6,050,571 A | * | 4/2000 | Rieder et al. | |
| 6,213,264 B1 | * | 4/2001 | Walker et al. | |
| 6,237,732 B1 | * | 5/2001 | DeLeeuw et al. | |

FOREIGN PATENT DOCUMENTS

| | | |
|---|---|---|
| GB | 2321677 A | 8/1998 |
| WO | WO 98/1757 | 4/1998 |

OTHER PUBLICATIONS

International Search Report, dated Jan. 4, 2001.

* cited by examiner

Primary Examiner—Anthony Knight
Assistant Examiner—Vishal Patel
(74) Attorney, Agent, or Firm—Carlson, Gaskey & Olds

(57) ABSTRACT

A washer seal for a cam braking system is disclosed that sealingly abuts a bushing assembly and a camshaft. The washer seal is preferably made of a metal washer bonded to a flexible material. The bushing assembly supports the camshaft in the cam braking system. The bushing washer seal is preferably generally ring-shaped having a first ring-shaped flat section defining a bore along a longitudinal axis, a second ring-shaped curved section contiguous with and spaced radially from the first section, and a lip that extends longitudinally from the second section. In a preferred embodiment, the lip extends from the washer seal at an angle from the washer seal second section. In an alternative embodiment, the lip extends from the washer seal at an angle from the washer seal first section. The bushing assembly includes a radially outer surface. The lip of the washer seal deforms radially outwardly to engage the bushing assembly radially outer surface, thereby providing an axial locating feature. The lip remains radially outwardly expanded while engaged with the bushing assembly. The internal bore of the washer seal is angled to receive the camshaft. Preferably, the washer seal does not rotate with the camshaft. Alternatively, the washer seal does rotate with the camshaft.

27 Claims, 3 Drawing Sheets

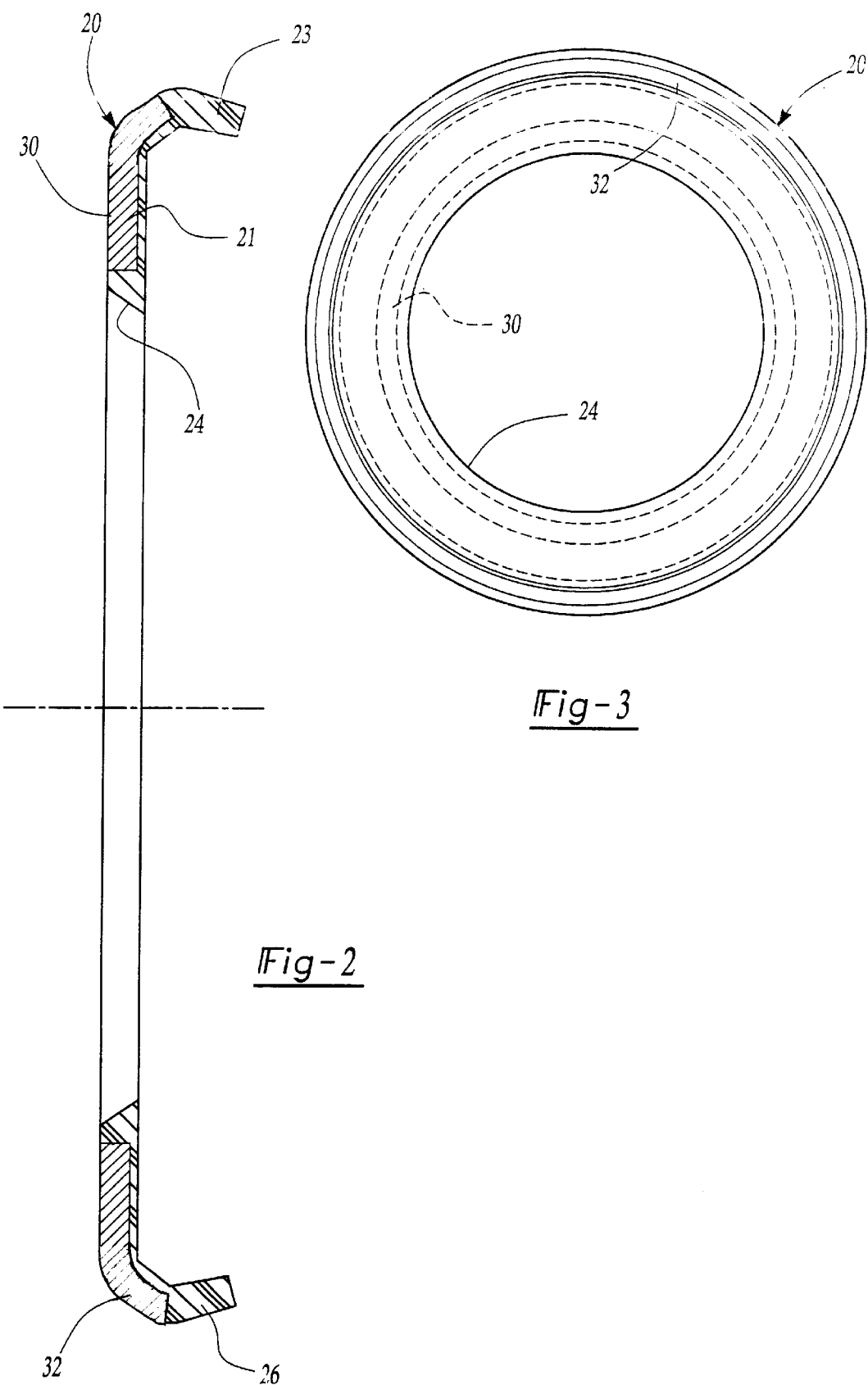

WASHER SEAL FOR A CAM BRAKING SYSTEM

BACKGROUND OF THE INVENTION

This invention generally relates to a washer seal for a cam braking system bushing assembly and more particularly to a washer seal that transmits axial forces between components in the braking system, prevents contaminants from entering the bushing assembly and acts as a secondary lubricant sealing system to contain lubricant within the cam brake bushing assembly.

Bushing assemblies are used to support a camshaft in a brake housing. As known, the brake camshaft drives a brake cam to actuate the brake. A secondary purpose of the bushing assembly is to allow for lubrication of the camshaft so that it can freely rotate.

Known cam bushing assemblies include a bushing retainer having an aperture and a bushing disposed within the aperture. This design allows for efficient lubrication flow around the camshaft.

Washers have been used in combination with cam bushing retainers. Typically, these washers have been simple metal disks, which do not conform to the specific size and location of adjacent components. The purpose of the washer is to maintain appropriate distances between cam brake components and to transmit axial forces between the camshaft and bushing retainer. However, the design of washers used with cam bushing retainers has not always been effective at preventing damage to the bushing assembly because the washer is not secured to the bushing assembly. Further, the washer does not act as a secondary sealing system. Lubrication could leak around the washer because the washer is not connected to the retainer.

An ineffective washer design allows dirt and debris to enter the bushing environment. The introduction of debris into the bushing environment contributes to increased wear of the bushing components and the camshaft. Increased wear of the components translates into frequent maintenance, high repair costs, and decreased life expectancy of all cam braking system components.

SUMMARY OF THE INVENTION

The cam bushing washer seal assembly of the present invention overcomes the above problems with known cam bushing washers. In general terms, the disclosed washer seal assembly covers and protects a bushing assembly in a cam braking system by sealingly conforming to the bushing retainer. The washer seal is made from a metal washer bonded to a flexible material. The flexible material is preferably a neoprene elastomeric compound. The washer seal assembly is directly connected to the bushing assembly by being deformed radially outwardly to engage the bushing assembly. The washer seal assembly is preferably used with a cam bushing assembly in a cam braking system.

There are several functions of the washer seal assembly. One function of the washer seal assembly is to provide a shield to minimize intrusion of debris and other contaminants around the camshaft support bushing and its associated seals. Dirt and contaminants cause damage to the bushing, its seals and ultimately the camshaft, thereby increasing the amount of required maintenance of those parts and the frequency of replacement. Therefore, it is desirable to minimize the amount of contaminants introduced to the bushing environment. The washer seal serves this purpose. Use of the washer seal decreases the wear of the bushing and the seals, therefore, increasing the useful life of bushing components and the camshaft.

The washer seal also provides for relative motion between the camshaft and the bushing retainer while transmitting axial forces between the camshaft and the bushing assembly. The washer seal isolates the bushing assembly from the camshaft, therefore, preventing wear on the bushing assembly due to camshaft rotation.

Further, the washer seal assembly acts as a secondary sealing system that supplements the primary sealing system. In other words, the washer seal provides seals around the camshaft and the bushing assembly to contain the lubrication within the bushing assembly.

These and other features of the invention may be best understood from the following specification and drawings. The following is a brief description of the drawings.

BRIEF DESCRIPTION OF THE DRAWINGS

FIG. 2 is a cross sectional view of a washer seal for a cam braking system.

FIG. 3 is a front view of a washer seal for a cam braking system.

DETAILED DESCRIPTION OF THE PREFERRED EMBODIMENT

Figure 1:
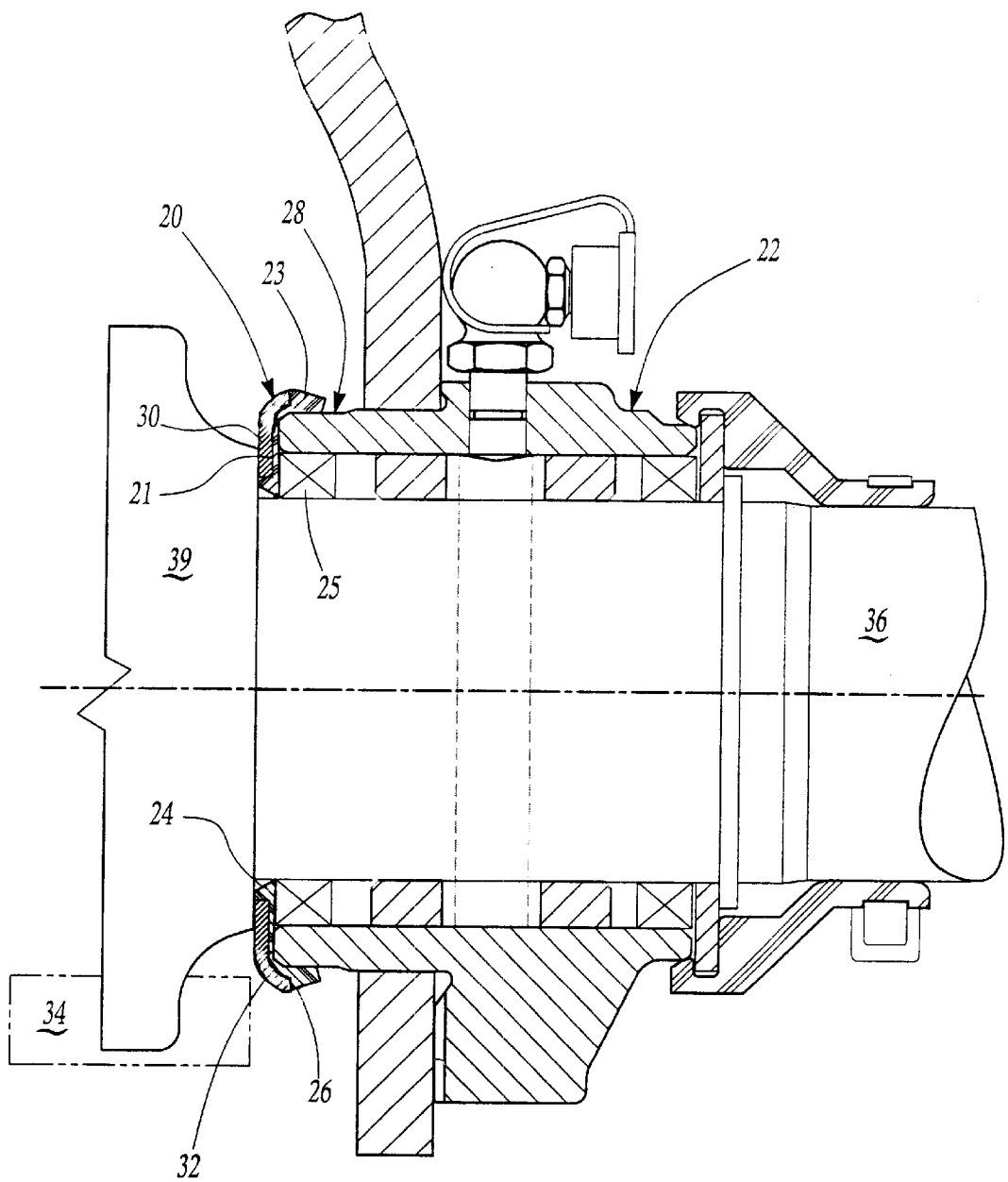
FIG. 1 is a cross sectional view of a system designed according to this invention.

FIG. 1 illustrates a washer seal for a cam braking system, shown at 20. Preferably, the washer seal 20 is made of a metal washer 21 bonded to a flexible material 23. The flexible material is preferably a neoprene elastomeric compound. Preferably the metal washer 21 is 0.070 inches thick and the flexible material is 0.011 inches thick. Preferably, the flexible material 23 is bonded to one side of the metal washer 21. Alternatively, the flexible material 23 is bonded to both sides of the metal washer 21.

The washer seal 20 preferably covers and protects a bushing assembly 22 in a cam braking system by directly connecting to the bushing assembly 22. Further, the washer seal 20 is, preferably, generally ring-shaped having an outer radial circumferential surface comprised of a lip 26 and an inner circumferential surface defining an interior bore 24.

The washer seal 20 can also be used in combination with a ring seal 25. The ring seal 25 is connected to the assembly 22 and is adjacent the washer seal 20.

The washer seal 20 covers a cam bushing assembly 22. Bushing assembly 22 supports a camshaft 36 defining a longitudinal axis. As known, a brake cam 39, shown schematically, is mounted on the same side of bushing assembly 22 as washer seal 20.

Washer seal 20 is designed to conform to the shapes of the camshaft 36 and bushing assembly 22. The interior bore 24 of the washer seal 20 receives the camshaft 36. The washer seal lip 26 extends from the washer seal 20 along the longitudinal axis. The function of the lip is to conform to a radially outer surface 28 of the bushing assembly 22. This is achieved by the washer seal lip 26 deforming radially outwardly to engage the bushing assembly radially outer surface 28, thereby providing an axial locating feature. The washer seal lip 26 is sized such that it remains radially outwardly expanded while engaged on the bushing assembly 22. The washer seal 20 allows relative motion between the camshaft 36 and the bushing assembly 22 and also transmits axial forces between the camshaft 36 and bushing assembly 22.

Preferably, the washer seal 20 is secured to the bushing assembly 22 such that the washer seal 20 is stationary with respect to the camshaft 36. In other words, the washer seal 20 does not rotate with the camshaft 36. Alternatively, the washer seal lip 26 could be dimensioned to make the washer seal rotate with the camshaft. Further, the washer seal lip 26 sealingly abuts the bushing assembly 22 radially outer surface 28 such that a good seal is provided. The seal contains the lubrication within the cam bushing assembly 22.

As shown in FIGS. 2 and 3, the washer seal 20 preferably could be said to have two radially contiguous sections surrounded by a lip 26. The first section 30 is generally ring-shaped and flat defining the interior bore 24. The second section 32 spaced radially outward from the first section 30 is generally ring-shaped and curved. Preferably, the metal washer 21 extends from said first section 30 into said second section 32. Alternatively, the metal washer 21 is located only in the first section 30. The lip 26 extends from the outer circumference of the second section 32. The curved second section 32 of the washer seal 20 provides guidance for the brake rollers 34 in the cam braking system, as shown in FIG. 1. In an alternative embodiment, there is no curved second section and the lip extends from the first flat section.

The interior bore 24 of the washer seal 20 surrounds the longitudinal axis and closely surrounds and maintains contact with the camshaft 36. Further, the washer seal 20 first section 30 interior bore surface 24 is preferably angled to allow the washer seal 20 to be installed around the camshaft 36 with less force than is required to remove the washer seal 20 from around the camshaft 36. The angled interior bore surface 24 sealingly abuts the camshaft 36, thus containing lubrication within the cam bushing assembly 22.

Figures 4, 5:
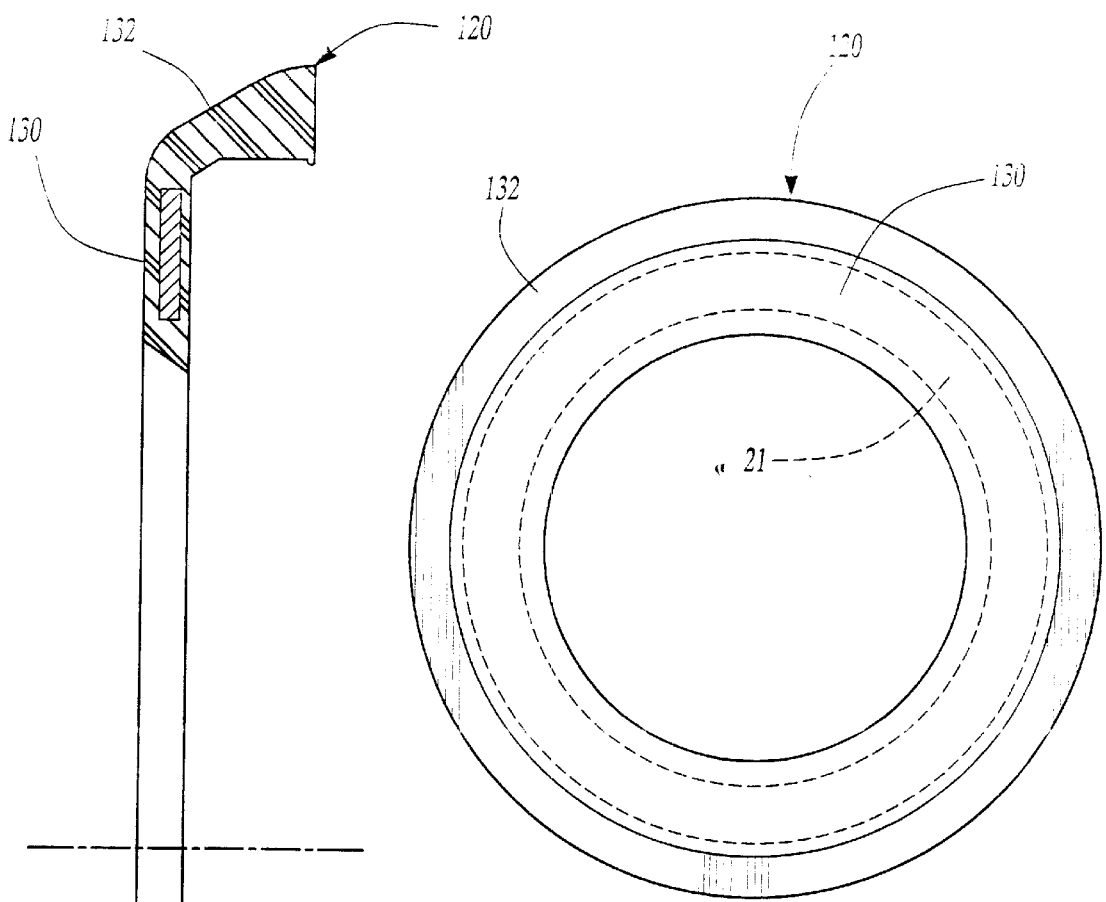
FIG. 4 is a cross sectional view of an alternative embodiment.
FIG. 5 is a front view of an alternative embodiment.

In the preferred embodiment, the lip 26 extends from the washer seal 20 at an angle from the washer seal second section 32. Another alternative embodiment is shown in FIGS. 3 and 4. This alternative embodiment of the washer seal 120 could be said to have two contiguous sections surrounded by a lip, similar to the FIG. 2 embodiment. The first section 130 is generally ring-shaped and flat. The second section 132 is generally ring-shaped and curved. The lip 126 extends from the outer circumference of the second section 32. However, the lip 126 extends from the washer seal 120 at an angle from the washer seal first section 130. Further, the washer seal 120 attaches directly onto the bushing assembly 22 and preferably does not rotate with the camshaft 36. Alternatively, the washer seal 20 could be dimensioned to rotate with the camshaft 36.

The washer seal lip 126 deforms radially outwardly to engage a radially outer surface 28 of the bushing assembly 22, thereby providing an axial locating feature. The washer seal lip 126 remains outwardly expanded while engaged with the bushing assembly 22. The lip 126 sealingly abuts the bushing assembly 22 radially outer surface 28 such that a good seal is provided to contain the lubrication within the cam bushing assembly 22.

The invention has been described in an illustrative manner, and it is to be understood that the terminology that has been used is intended to be in the nature of words of description rather than of limitation. Modifications and variations of the examples described above are possible and it must be understood that such changes may be within the scope of the following claims. In other words, the invention may be practiced otherwise than as specifically described above.

What is claimed is:

1. A cam braking assembly comprising:
   a camshaft defining a longitudinal axis;
   a bushing assembly supporting said camshaft, said bushing assembly including a bushing retainer defining a radially outer surface; and
   a washer seal having an interior bore surrounding said longitudinal axis that closely surrounds said camshaft and a lip surrounding a radial circumference of said washer seal that conforms continuously from an axial surface of the busing retainer to said radially outer surface, said washer seal providing for relative motion between said camshaft and said bushing assembly and transmitting axial forces between said camshaft and said bushing assembly.

2. The assembly of claim 1, wherein said washer seal is made of a metal washer bonded to a flexible material.

3. The assembly of claim 2, wherein said flexible material is neoprene elastomeric compound.

4. The assembly of claim 1, wherein said washer seal is generally ring-shaped having an outer circumferential surface comprised of said lip and an inner circumferential surface defining said interior bore.

5. The assembly of claim 4, wherein said washer seal has a first ring-shaped flat section defining said bore and a second contiguous ring-shaped curved section spaced radially from said first section, and said lip extends from said second section.

6. The assembly of claim 5, wherein said washer seal is made of a metal washer bonded to a flexible material, said metal washer is located in said first section.

7. The assembly of claim 6, wherein said metal washer is located in said second section.

8. The assembly of claim 4, wherein said inner circumferential surface is angled to allow said washer seal to be installed around said camshaft with less force than is required to remove said washer seal from around said camshaft.

9. The assembly of claim 8, wherein said inner circumferential surface sealingly abuts said camshaft.

10. The assembly of claim 9, wherein said lip extends along the longitudinal axis.

11. The assembly of claim 10, wherein said lip extends from said washer seal at an angle from said washer seal second section.

12. The assembly of claim 10, wherein said lip extends from said washer seal at an angle from said washer seal first section.

13. The assembly of claim 10, wherein said lip deforms radially outwardly to engage said radially outer surface and said lip remains radially outwardly expanded while engaged with said bushing assembly.

14. The assembly of claim 13, wherein said washer seal lip sealingly abuts said radially outer surface.

15. The assembly of claim 1, further comprising a ring seal connected to said bushing assembly and adjacent said washer seal.

16. The assembly of claim 1, wherein said lip defines a lip shape and said outer surface defines a surface shape wherein said lip shape is the same as said surface shape so that said lip conforms to said radially outer surface of said bushing retainer to provide a sealed environment.

17. The assembly of claim 1, wherein said lip defines a longitudinal surface along said longitudinal axis, said longitudinal surface completely engaging said bushing assembly circumferentially along an entire length of said longitudinal surface such that said lip conforms to a shape defined by said radially outer surface of said bushing retainer.

18. The assembly of claim 1 wherein said bushing retainer defines an aperture for retaining a bushing and wherein said washer seal is disposed at one end of said bushing retainer with a first portion extending parallel to said longitudinal axis to form said lip and a second portion extending transverse to said longitudinal axis against an edge of said bushing retainer, said second portion defining said interior bore.

19. A cam braking assembly comprising:
   a camshaft for actuating a brake cam to apply a braking force;
   a bushing assembly rotatably supporting said camshaft and having a bushing defining an inner surface and a bushing retainer defining a radially outer surface wherein said bushing is retained within an aperture formed within said bushing retainer; and
   a washer seal for providing a sealed environment for retaining lube within said bushing assembly while allowing relative motion between said camshaft and said bushing assembly during application of said braking force, said washer seal having a ring-shaped body defining an interior bore that surrounds said camshaft and having a radially extending resilient lip that conforms continuously form an axial surface of the bushing retainer to said radial outer surface of said bushing retainer.

20. The assembly of claim 19 wherein said ring-shaped body is positioned between said brake cam and said bushing assembly.

21. The assembly of claim 20 wherein said washer seal includes a seal inner surface and a seal outer surface with said interior bore extending therebetween and wherein said seal outer surface engages said brake cam and said seal inner surface engages an end face of said bushing retainer.

22. The assembly of claim 19 wherein said washer seal comprises a metal washer bonded to a flexible material.

23. The assembly of claim 22 wherein said metal washer includes an outer face and an inner face interconnected by an interior circumferential edge and an exterior circumferential edge, said flexible material being bonded to said inner face and said edges, leaving said outer face exposed such that said flexible material engages said camshaft and said outer surface of said bushing retainer while said outer face of said metal washer abuts against said brake cam.

24. The assembly of claim 19 wherein said metal washer is completely encapsulated within said flexible material.

25. The assembly of claim 19 including a ring seal positioned between said inner surface and said camshaft and in sealing engagement with said washer seal.

26. The assembly of claim 19, wherein said lip defines a lip shape and said outer surface defines a surface shape wherein said lip shape is the same as said surface shape so that said lip conforms to said outer surface to provide a sealed environment.

27. The assembly of claim 19, wherein said lip defines a longitudinal surface that completely engages said outer surface of said bushing retainer circumferentially along an entire length of said longitudinal surface such that said lip conforms to a shape defined by said outer surface of said bushing retainer.

* * * * *